May 2, 1933. P. PARR 1,907,000
APPARATUS FOR CUTTING RACK BARS
Filed Aug. 12, 1931 2 Sheets-Sheet 1
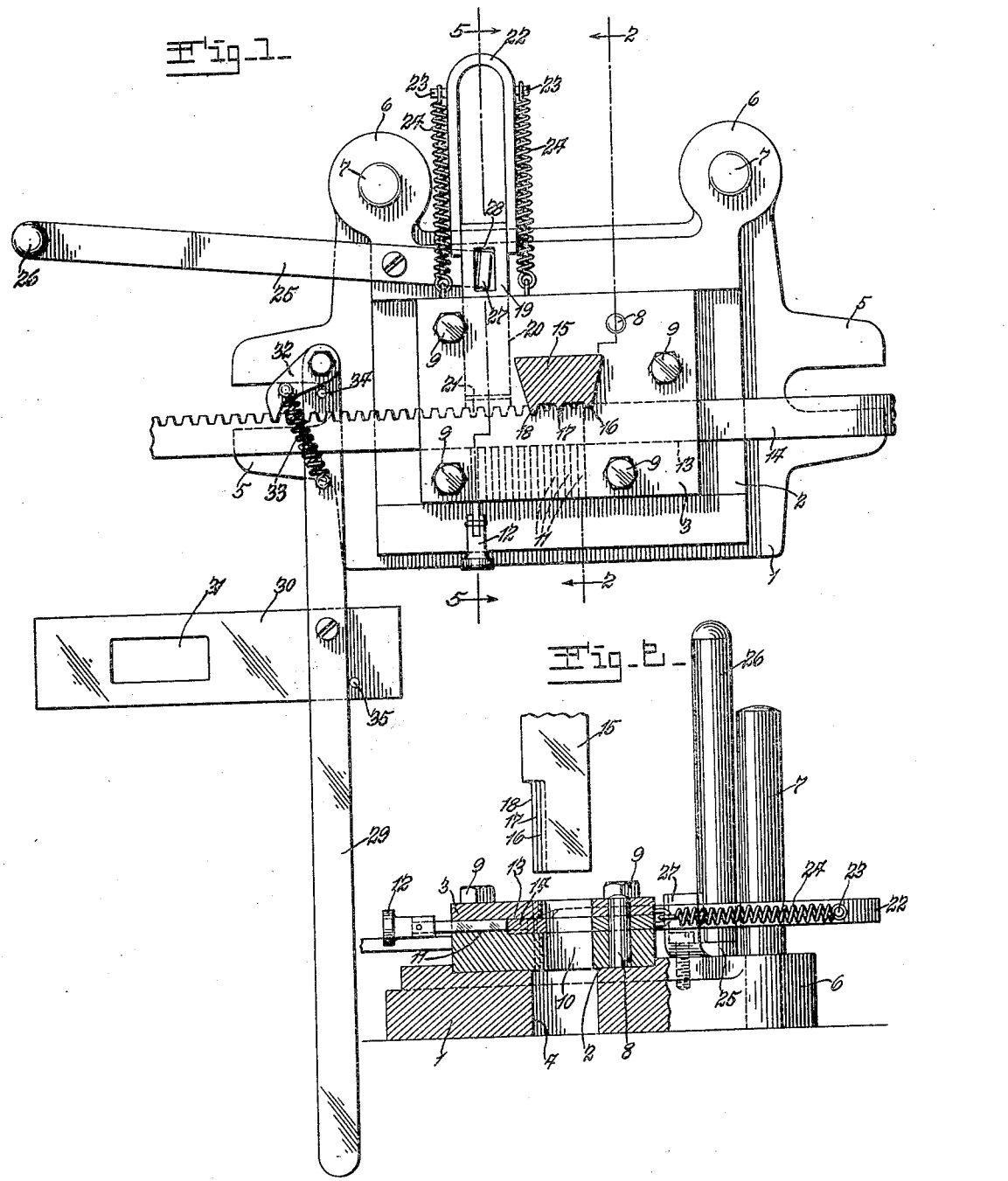
Inventor
Peter Parr
by Rippey & Kingsland
His Attorneys May 2, 1933.   P. PARR   1,907,000
APPARATUS FOR CUTTING RACK BARS
Filed Aug. 12, 1931   2 Sheets-Sheet 2
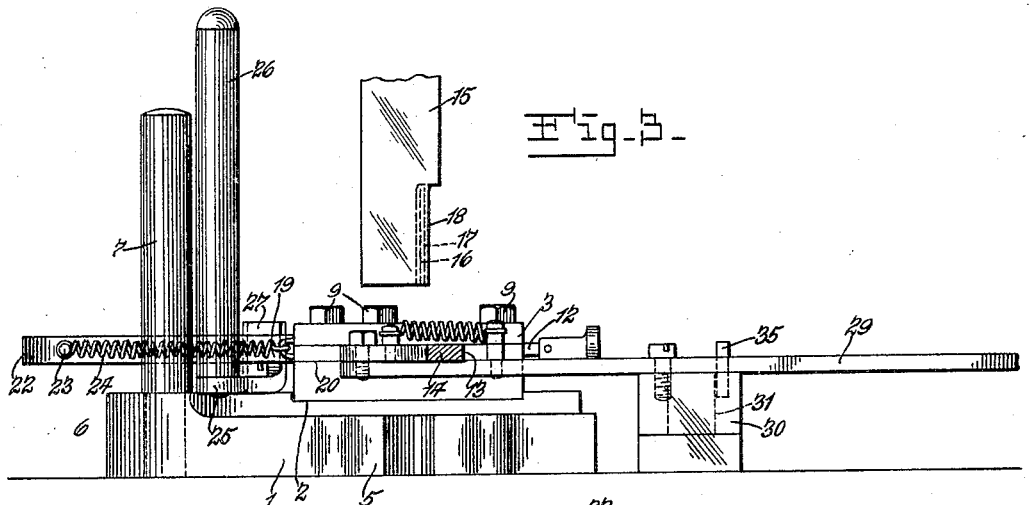
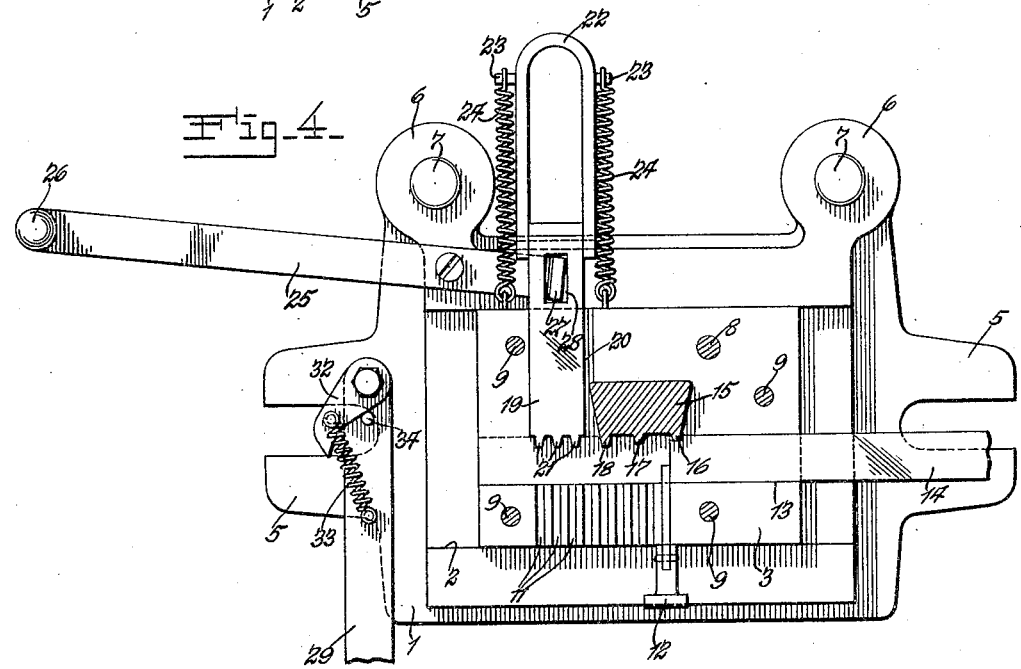
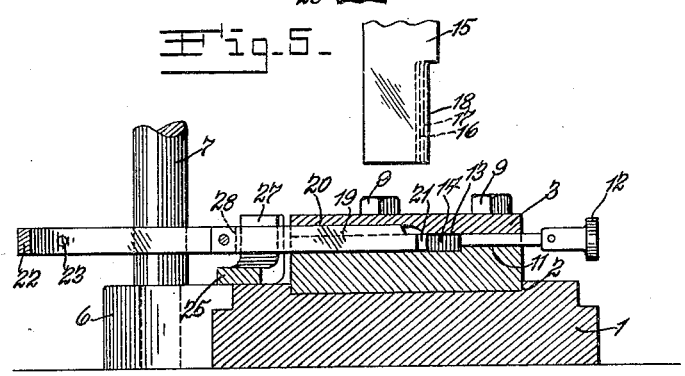
Inventor
Peter Parr
by Ripley & Kingsland
His Attorneys Patented May 2, 1933

1,907,000

UNITED STATES PATENT OFFICE

PETER PARR, OF NORMANDY, MISSOURI, ASSIGNOR TO METALLIC SASH-OPERATOR COMPANY, A CORPORATION OF MISSOURI

APPARATUS FOR CUTTING RACK BARS

Application filed August 12, 1931. Serial No. 556,535.

This invention relates to improvements in apparatus for cutting rack bars; and consists in the novel construction hereinafter disclosed.

An object of the invention is to provide an apparatus by which teeth may be cut in a bar to produce a rack bar having the teeth formed therein accurately by a broaching operation; that is to say, uniform spaced teeth are cut in the edge of the bar, the cutting of the teeth being performed in stages.

Another object of the invention is to provide an apparatus for the purpose mentioned which will be continuous and automatic in its operation.

Additional advantages of the construction will be apparent from the following detailed description thereof, taken in connection with the accompanying drawings, in which—

Fig. 1 is a plan view of the punch and die and work support with the mechanism for advancing the rack bar to the cutting point.

Fig. 2 is a vertical section substantially on the line 2—2 of Fig. 1.

Fig. 3 is an end view.

Fig. 4 is a plan view with the upper plate removed.

Fig. 5 is a vertical section substantially on the line 5—5 of Fig. 1.

In the embodiment of the invention illustrated in the drawings, the apparatus is shown as including a die, a punch, a work support, and an escapement mechanism for advancing the work. The die and the work support with the associated parts are designed to be mounted in a press with the presser member arranged to carry the cutting die or punch.

The structure includes a base plate 1 recessed at 2 to receive the die block 3. The base plate has an opening 4 therein over which the die opening in the die block is placed to permit the passage therethrough of the punchings. The base plate is provided at its ends with channel lugs 5 that act as a guide and attaching means for mounting the base plate upon the bed of the press. The base plate is also provided with circular lugs 6 at one side which support guide pins 7 for guiding the presser member of the press.

The die block is mounted in the recess 2 of the base and is positioned in respect thereto by a dowel pin 8 and connected therewith by screws 9 that pass through the upper face of the die block and into the base. The die block has a die opening 10. The lower part of the die opening 10 serves, in cooperation with the punch, to form the teeth in the bar. The edges of the upper part of the opening 10 above the work serve as a stripper to strip the punchings from the punch, the punchings then passing through the die openings and through the opening 4 in the base plate. The die edge of the opening is provided with a spaced series of grooves of different depths, the spacing between the grooves being equivalent to the space between two teeth to be cut in the rack bar.

Through the forward vertical face of the die block is a series of spaced openings 11 through which a stop pin 12 may be inserted to position the bar in which the rack teeth are to be cut. Below the face of the die block is a longitudinal rectangular opening 13 into which the bar 14 is moved. The punch member of the die 15 is mounted in the presser member of the press and reciprocates vertically above the die opening 10. The punch member has a cutting edge which comprises a series of spaced projections 16, 17 and 18. The projection 16 is substantially one-third of the depth of the cut for the groove between the teeth to be cut in the bar; the projection 17 is substantially two-thirds of the depth of the space to be cut between each of the teeth on the rack; and the projection 18 is the full depth of the space to be cut. The projections 16, 17 and 18 are spaced complementary with the grooves in the die member and are a distance apart equivalent to alternate spaces between teeth cut in the rack bar.

It has been found that, by spacing the projections on the punch as described, the teeth may be more accurately cut and the punch may be made more rigid and durable.

In operating the apparatus to cut teeth in the bar 14, the pin 12 is set in the first opening 11 to the right, particularly as shown in Fig. 4. The projecting end of the pin within the space 13 acts as an abutment for the end of the bar fed to the cutting point. The position of the rack bar 14 in Fig. 4 illustrates the initial cutting operation. It will be noted that the end of the rack bar rests against the inward projection of the pin 12, bringing an edge of the bar in alinement with the projection 16 of the punch which cuts the space to approximately one-third of its ultimate depth. The bar is then advanced by the movement of the pin from one of the openings 11 to the next opening, thereby progressively cutting, by a broaching operation, the spaces between the teeth of the rack bar. The punching die also shapes and forms the marginal edges of the teeth.

After a series of teeth have been cut in the approaching end of the bar, the setting of the work is accomplished by a sliding bar 19 operating in a slide 20 through the face of the die block. The bar 19 has a series of teeth 21 in its forward edge which are adapted to be moved into engagement with the spaces between the teeth formed on the rack bar when the rack bar has approached to a point in alinement with the teeth on the bar 19.

The outer end of the bar 19 carries a U-shaped arm 22 having pins 23 on opposite sides thereof. Retractile springs 24 are connected, respectively, with the pins 23 and are attached at their opposite ends to the rear side face of the die block. The springs 24 tend to move the bar 19 inwardly so that the teeth of the bar 19 are held in engagement in the slots between the teeth on the rack bar 14, thereby holding the rack bar in position for the cutting operation. The bar 19 is moved out of engagement with the rack by means of a lever 25 having a handle 26 on its outer end. The lever 25 is pivoted to the base plate and the forward end of the lever has a vertical arm 27 that operates in a slot 28 in the bar 19. By operation of the lever 25, the bar 19 is moved in opposition to the springs 24, so that the teeth move out of engagement with the rack bar 14, thereby releasing the rack bar and permitting it to be advanced to a new cutting position, after which, upon release of the lever 25, the springs 24 cause the bar 19 to engage the rack.

The apparatus is also equipped with an escapement mechanism for automatically advancing the rack bar after one end thereof has been cut. The escapement mechanism is designed to advance the bar 14 the exact distance required to bring the edge of the bar into sequential cutting positions.

The escapement mechanism comprises a lever 29 that extends forwardly of the press and is pivoted to a plate 30 that may be attached to the bed of the press, an opening 31 being provided in the plate 30 for receiving an attaching member. The lever 29 carries at its inner forward end a pawl 32 to which a spring 33 is connected, the opposite end of the spring being connected with the face of the lever 29. A stop pin 34 on the face of the lever adjacent to the pawl acts as an abutment permitting the pawl to operate as the lever 29 is moved to move the bar 14 forwardly. The extent of movement of the lever 29 is limited by a pin 35 in the face of the plate 30. As the forward end of the lever 29 is moved to the left (Fig. 1), the pawl rides over one tooth of the rack bar and seats in the next space between the teeth on the rack bar; then, when the forward end of the lever is moved to the right, the inner end of the lever moves to the left and the pawl, being in contact with the stop 34, is moved also to the left and moves the bar forward the extent of one tooth cut in the bar. This brings the bar to a new cutting position with respect to the punch and die.

From the foregoing description, it will be understood that the apparatus provides a means for accurately cutting teeth in a bar to form a rack bar, whereby the cutting is performed in stages; and that it also provides means for accurately positioning the bar at the cutting point and for advancing the bar accurate distances to bring it into position to receive the next punching or cutting operation.

I am aware that the invention may be modified in numerous particulars without departure from the spirit and scope of the invention. I do not limit myself, therefore, to the exact construction shown and described, but what I claim and desire to secure by Letters Patent is:—

1. In an apparatus for cutting teeth in bars, the combination of a die block having a die member formed therein, said die member having grooves in a vertical face thereof of progressively increasing depths, a vertically reciprocating punch member having cutting projections thereon arranged complementary with the grooves in the die member, work supporting portions formed in said die block, and means for positioning the edge of a bar in advancing cutting positions whereby grooves are cut in the edge of said bar of progressively increasing depth.

2. In an apparatus for cutting teeth of progressively increasing depth in an edge of bars, the combination of a die block having a die member formed therein, said die member having grooves in a vertical face thereof of progressively increasing depths, a vertically reciprocating punch member having cutting projections thereon arranged complementary with the grooves in the die member, a work supporting portion formed in said die block, and a stop pin adapted to be adjusted at spaced advanced positions for positioning the work.

3. In an apparatus for cutting teeth in bars, the combination of a die block having a die member formed therein, said die member having vertical grooves in a face thereof of progressively increasing depths, a vertically reciprocating punch member having cutting projections thereon arranged complementary with the grooves in the die member, a work supporting portion formed in said die block, and a manually operable stop device for engaging teeth on the rack bar for holding the bar in advancing cutting positions, whereby grooves are cut in the edge of said bar of progressively increasing depth.

4. In an apparatus for cutting teeth in bars, the combination of a die block having a die member formed therein, said die member having vertical grooves of progressively increasing depths, a punch member having cutting projections thereon arranged complementary with the grooves in the die member, a work supporting portion formed in said die block, a manually operable stop device for engaging teeth on the rack bar for holding the bar in advancing cutting position whereby grooves are cut in the edge of said bar of progressively increasing depth, and an escapement mechanism for advancing the rack bar to successive cutting positions.

5. In an apparatus of the class described, a base plate, a die block supported by the base plate, said die block having a die opening therein for progressively cutting the edges of a bar to form in progressive stages rack teeth thereon, a passageway formed in the die block adapted to receive and hold a bar with an edge thereof parallel with the die opening, a stop bar having teeth formed thereon adapted to contact with teeth cut in the rack bar, manual means for disengaging said stop bar, means operable to move the rack bar successive distances to advance the work one tooth interval, and a vertically reciprocating punch member cooperating with the die opening for progressively cutting spaces in the edge of the bar to form the rack teeth.

6. In an apparatus of the class described, a base plate, a die block supported by the base plate, said die block having a die opening therein for progressively cutting a vertical edge of a bar to form in progressive stages rack teeth thereon, a passageway formed in the die block adapted to receive and hold a bar with an edge thereof parallel with the die opening, a stop bar having teeth formed thereon adapted to contact with teeth cut in the rack bar, manual means for disengaging said stop bar, means operable to move the rack bar limited successive distances comprising a lever pivoted to swing in a horizontal plane, a pawl positioned parallel to said lever adapted to engage teeth on the rack bar, a spring for moving the pawl into engagement with the space between the teeth on the rack bar and a stop device limiting the movement of the lever, and a punch member cooperating with the die opening for cutting spaces in the edge of the bar to form the rack teeth.

7. In an apparatus of the class described, the combination of a die having grooves formed in one vertical face thereof of progressively increasing depth, a vertically reciprocating punch member having cutting projections complementary to the grooves in the die, and a work positioning device for holding a bar in successive positions whereby the edge of the bar has grooves cut therein to form teeth of successively increasing depth.

PETER PARR.